(12) United States Patent
Ma

(10) Patent No.: US 10,542,595 B2
(45) Date of Patent: Jan. 21, 2020

(54) LED LAMP POWER SUPPLY

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Xuhong Ma, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 22 days.

(21) Appl. No.: 16/163,218

(22) Filed: Oct. 17, 2018

(65) Prior Publication Data

US 2019/0141804 A1 May 9, 2019

(30) Foreign Application Priority Data

Nov. 3, 2017 (CN) .......................... 201711068244.3

(51) Int. Cl.
*H05B 33/08* (2006.01)
*H02M 1/32* (2007.01)
(Continued)

(52) U.S. Cl.
CPC .......... *H05B 33/0815* (2013.01); *H02M 1/32* (2013.01); *H02M 1/36* (2013.01); *H02M 3/33507* (2013.01); *H02M 7/155* (2013.01); *H05B 33/0824* (2013.01); *H05B 33/0845* (2013.01); *H02M 1/4258* (2013.01);
(Continued)

(58) Field of Classification Search
CPC ............ H05B 33/0815; H05B 33/0845; H05B 33/0824; H02M 7/155; H02M 3/33507; H02M 1/36; H02M 1/32; H02M 1/4258; H02M 2001/0032; H02M 2001/0006; Y02B 20/341

See application file for complete search history.

(56) References Cited

U.S. PATENT DOCUMENTS

2008/0304195 A1* 12/2008 Lin .................... H02M 1/32
361/89
2011/0194315 A1* 8/2011 Gaknoki ......... H02M 3/33507
363/21.17

(Continued)

*Primary Examiner* — Renan Luque
(74) *Attorney, Agent, or Firm* — Wang Law Firm, Inc.

(57) ABSTRACT

An LED lamp power supply includes a power conversion module, an AC/DC control module, a dimming control module, and an auxiliary control module. The auxiliary control module further includes a sampling unit, a starting range value preset unit, a protection value preset unit, and a control unit. The sampling unit is configured to continuously collect the value of the output supply voltage. The control unit causes the dimming control module to be in a standby mode of operation when the value of the collected output supply voltage falls outside the normal stable operating voltage range and is greater than the highest voltage value. The control unit causes the dimming control module to be in a protection mode of operation when the value of the collected output supply voltage is less than or equal to the highest voltage value. The LED lamp power supply can solve the short circuit or overload of the whole circuit and the technical problems of the flashing of the LED lamp during the dimming process, thereby providing the light-emitting effect of the LED lamp to meet the needs of the user.

9 Claims, 4 Drawing Sheets

(51) Int. Cl.
*H02M 1/36* (2007.01)
*H02M 3/335* (2006.01)
*H02M 7/155* (2006.01)
*H02M 1/00* (2006.01)
*H02M 1/42* (2007.01)

(52) U.S. Cl.
CPC ............... *H02M 2001/0006* (2013.01); *H02M 2001/0032* (2013.01); *Y02B 20/341* (2013.01)

(56) References Cited

U.S. PATENT DOCUMENTS

| | | | | |
|---|---|---|---|---|
| 2014/0126254 | A1* | 5/2014 | Al-Shyoukh | G05F 1/468 363/49 |
| 2015/0002036 | A1* | 1/2015 | Sun | H05B 33/0815 315/200 R |
| 2015/0271882 | A1* | 9/2015 | Melanson | H05B 33/0815 315/186 |
| 2017/0251542 | A1* | 8/2017 | Spira | H05B 33/0845 |

* cited by examiner

LED LAMP POWER SUPPLY

CROSS-REFERENCE TO A RELATED APPLICATION

This application claims priority to a Chinese Patent Application No. CN 201711068244.3, filed on Nov. 3, 2017.

FIELD OF THE TECHNOLOGY

The present invention relates to lighting system, with particular emphasis on a LED lamp power supply.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As mentioned above, the use of light-emitting diodes as light-emitting sources has the advantages of power saving and greater brightness, so it has gradually become common in use. It is well known that the quality of a power supply for which it is supplied plays an important role in the quality of the LED lamp. It is also a factor that must be carefully considered by the user and the manufacturer.

SUMMARY OF THE INVENTION

Therefore, it is necessary to provide a high-performance LED lamp power supply to meet the above requirements.

An LED lamp power supply comprises a power conversion module, an AC/DC control module for controlling the output of the power conversion module, and a dimming control module electrically connect with the AC/DC control module, and an auxiliary control module for controlling an operating state of the dimming control module, the AC/DC control module controlling the power conversion module to generate an output supply voltage and controlling the size of the output supply voltage, the dimming control module is powered by the output supply voltage, and the auxiliary control module further includes a sampling unit, a startup range value preset unit, a protection value preset unit, and a control unit, the sampling unit is configured to continuously collect the value of the output supply voltage, the startup range value preset unit is configured to preset a normal stable working voltage range value of the output supply voltage, and the protection value preset unit is configured to preset the maximum voltage value of the output supply voltage that makes the dimming control module in standby mode when the LED lamp power supply is in short circuit or overload, the control unit causes the dimming control module to be in a standby working mode when the value of the collected output supply voltage falls outside the normal stable operating voltage range value and is greater than the highest voltage value, the control unit causes the dimming control module to be in a protection mode of operation when the value of the collected output supply voltage is less than or equal to the highest voltage value.

Advantageously, the LED lamp power supply further includes a dimming signal input module for controlling an output of the dimming control module.

Advantageously, the dimming signal input module is a thyristor, and the thyristor is electrically connected to an input end of the power conversion module.

Advantageously, the LED lamp power supply further includes a dimming execution module electrically connected to an output end of the power conversion module, and the dimming control module is electrically connected to the dimming execution module to control an output of the dimming execution module.

Advantageously, the dimming execution module includes a MOS transistor.

Advantageously, the dimming signal input module is a 0 to 10 volt dimmer, and the 0 to 10 volt dimmer is directly electrically connected to the dimming control module to control an output of the dimming control module.

Advantageously, the dimming control module directly controls an output of the AC/DC control module in accordance with the 0 to 10 volt dimmer.

Advantageously, the auxiliary control module further includes a delay unit, wherein the delay unit is configured to extend the time when the control unit controls the dimming control module to be in a protection state when the value of the current output supply voltage collected by the sampling unit is less than the highest voltage value, that is, the LED lamp power supply is short-circuited or overloading.

Advantageously, any one of the normal stable operating voltage range values is greater than the highest voltage value.

Advantageously, the dimming signal input module is a WIFI or DALI dimmer, and the WIFI or DALI dimmer is directly connected to the dimming control module to control the output of the dimming control module.

Compared with the prior art, the LED lamp power supply can solve the short circuit or overload of the whole circuit, as well as the LED lamp flicker in the dimming process and other technical problems, thereby providing the quality of the LED lamp power supply, and thus providing the light-emitting effect of the LED lamp, thereby meeting the needs of the user.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
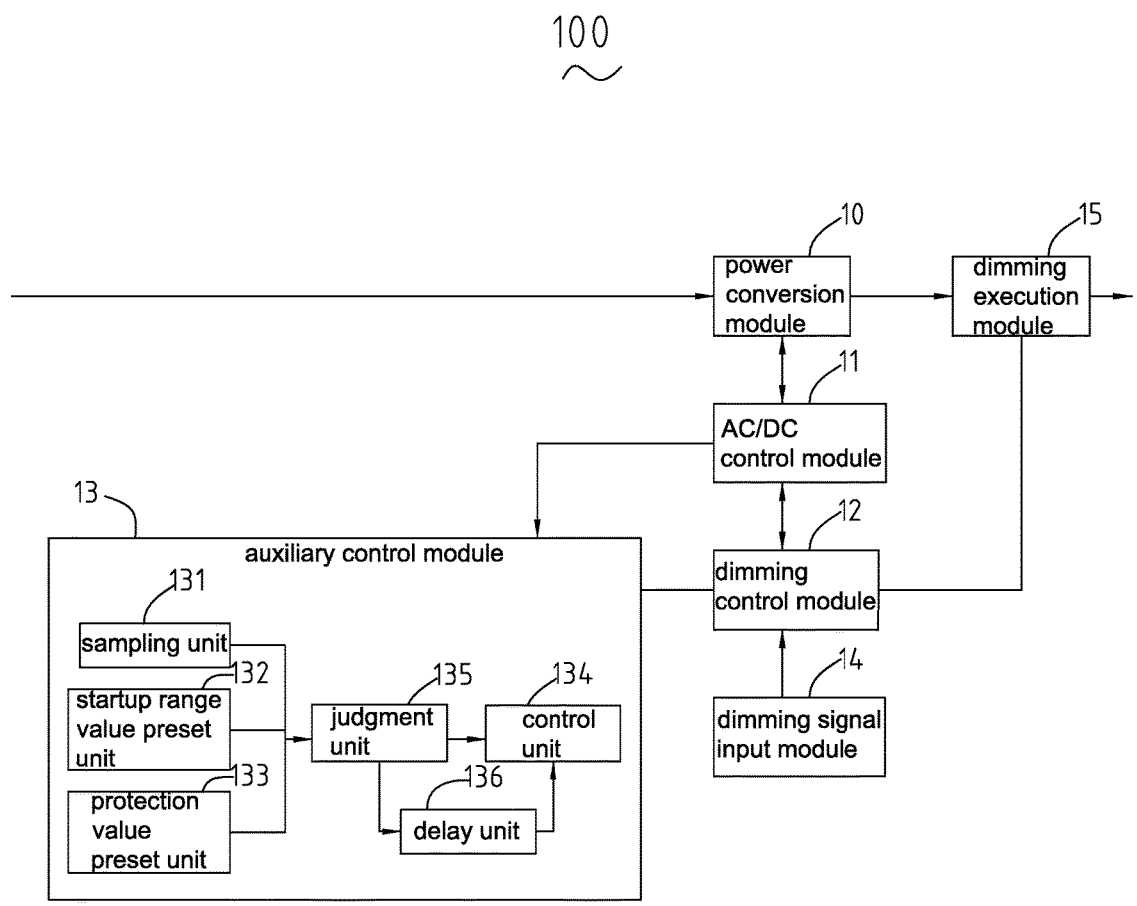
FIG. 1 is a schematic block diagram of a LED lamp power supply according to a first embodiment of the present invention.
Figure 2:
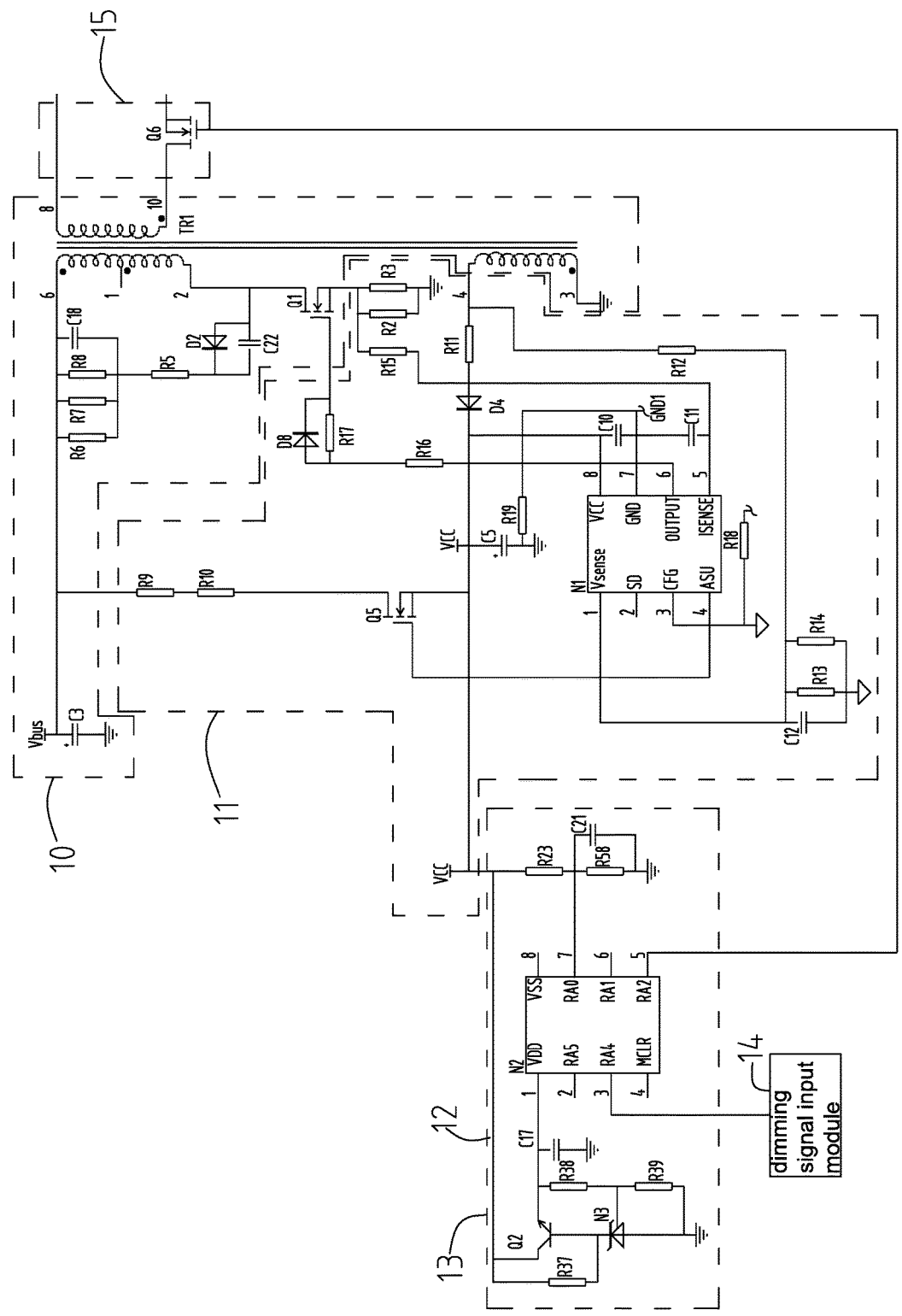
FIG. 2 is a circuit diagram of the LED lamp power supply of FIG. 1.

Please refer to FIG. 1 and FIG. 2, which are schematic block diagrams and circuit diagrams of an LED lamp power supply 100 according to the present invention. The LED lamp power supply 100 includes a power conversion module 10, an AC/DC control module 11 for controlling the output of the power conversion module 10, and a dimming control module 12 electrically connected to the AC/DC control module 11, an auxiliary control module 13 for controlling the working state of the dimming control module 12, a dimming signal input module 14 electrically connected to the dimming control module 12, and an dimming execution module 15 electrically connected to the output of the LED lamp power supply 100. It is conceivable that the LED lamp power supply 100 further includes other functional modules, such as a filtering module, a rectification module, a power factor correction module, a feedback module, etc.; it shall be a common function module of LED lamp power supply in the existing technology and is learned by technical personnel in this field. It will not be explained in detail here.

The power conversion module 10 is configured to convert high voltage direct current into low voltage direct current suitable for powering LED lamps (not shown in figure). Of course, in the embodiment, The output of the power conversion module 10 shall first pass through the dimming execution module 15 before the power conversion module 10 supplying power to the LED lamp, so the output of the power conversion module 10 shall firstly be adapted to the dimming execution module 15. Thus, the power conversion module 10 also includes a single stage flyback switch control circuit that can be a single stage flyback high PFC circuit. The single-stage flyback switch control circuit is that the transformer supplies energy to the output capacitors and loads during the turn-off of the switch T, and the direction of the current during the power supply is single. The power conversion module 10 includes a transformer winding, the phase of the input and output of the transformer winding is opposite, and the amplitude is proportional to the turn ratio of the line resistance corresponding to the input and output, thus, a suitable low voltage is provided for the dimming execution module 15.

The function of the AC/DC control module 11 is to control the power conversion module 10 to convert alternating current into direct current for use by a load, that is, an LED lamp, because the current used by the LED lamp must be direct current. The AC/DC control module 11 includes an AC/DC control chip N1, and some peripheral circuits that assist the AC/DC control chip N1 to operate normally. Regarding the structure and working principle of the AC/DC control chip N1, and its peripheral circuits, it should be a technique known to those skilled in the art, and details are not described herein again. The AC/DC control module 11 is electrically connected to the power conversion module 10 and obtains a first startup voltage from the power conversion module 10. Because of the structure and working principle of the AC/DC control chip N1, after the initial startup of the AC/DC control chip N1, the AC/DC control chip N1 will control the power conversion module 10 to generate an output supply voltage Vcc and also controls the magnitude of the output supply voltage Vcc. The output supply voltage Vcc, after the initial startup voltage is obtained by the AC/DC control chip N1, will provide an operating voltage for the AC/DC control chip N1, and also provide a working voltage for the functional modules such as the dimming control module 12. It is because the functional module such as the dimming control module 12 draws power from the output supply voltage Vcc terminal. When the AC/DC control chip N1 is initially activated, the power conversion module 10 can provide a weak starting voltage to the AC/DC control chip N1. If the functional module such as the dimming control module 12 is powered on from the output supply voltage Vcc to start, the AC/DC control chip N1 cannot be started normally. To solve this problem, an additional circuit has to be taken from the high voltage end of the entire circuit to supply the dimming control module 12. The present invention can solve the technical problem, and the specific working principle will be explained below.

The dimming control module 12 is configured to control an output of the AC/DC control module 11 to control an output of the power conversion module 10 according to a dimming signal output by the dimming signal input module 14. That is, the dimming control module 12 controls the magnitude of the voltage value output by the power conversion module 10 according to the dimming signal output by the dimming signal input module 14. The dimming control module 12 is powered by the output supply voltage Vcc. In this embodiment, the dimming control module 12 is executed by a single chip microcomputer to reduce the complexity of the entire circuit and reduce the volume of the LED lamp power supply. Of course, it is conceivable that the dimming control module 12 can also be constructed by basic electronic components such as diodes, transistors, MOS transistor, and resistors, capacitors, and the like. Since the output supply voltage Vcc supplies power to the AC/DC control module 11, the dimming control module 12 can control the size of the value of the output signal of the AC/DC control module 11 by controlling the magnitude of the voltage of the output supply voltage Vcc.

The auxiliary control module 13 is configured to control an operating state of the dimming control module 12, thereby controlling an operating state of the AC/DC control module 11. The auxiliary control module 13 can also be powered by the output supply voltage Vcc. In this embodiment, the auxiliary control module 13 can also be executed by a single chip microcomputer. Therefore, in this embodiment, the auxiliary control module 13 and the dimming control module 12 are executed by the same single chip microcomputer N2. It is of course conceivable that the auxiliary control module 13 can also be formed by some basic electronic components such as diodes, transistors, MOS tubes, and resistors and capacitors. However, the use of an integrated circuit such as a single chip microcomputer N2 can not only reduce the complexity of the circuit and reduce the volume of the LED lamp power supply. Since the function of the auxiliary control module 13 is performed by the microcontroller N2, the function of the auxiliary control module 13 is implemented by a computer program. As for the writing of the computer program, the applicant believes that those skilled in the art can use existing programming languages such as VB, VC and assembly language to write according to the idea of the present invention, so the computer language itself should be prior art. The auxiliary control module 13 includes a sampling unit 131, a startup range value preset unit 132, and a protection value preset unit 133, a control unit 134, and a judgment unit 135. The sampling unit 131 is configured to continuously collect the value of the output supply voltage Vcc to monitor the working state of the AC/DC control module 11 and the entire LED lamp power supply 100 at any time. The startup range value preset unit 132 is configured to preset a normal stable operating voltage range value of the output supply voltage Vcc. When the value of the output supply voltage Vcc falls within the normal stable operating voltage range value, it indicates that the AC/DC control module 11 is in a normal working state. The protection value preset unit 133 is configured to preset a highest voltage value of the output supply voltage Vcc that causes the dimming control module 12 to be in a protection operation mode when the LED lamp power supply 100 is short-circuited or overloaded. The judgment unit 135 is configured to judge a relationship between a value of the current output supply voltage Vcc collected by the sampling unit 131 and the normal stable operating voltage range value and a highest voltage value. The control unit 134 is configured to control an operating state of the dimming control module 12 to control an operating state of the AC/DC control module 11 according to an output result of the judgment unit 135. When the value of the current output supply voltage Vcc collected by the sampling unit 131 is within the normal stable operating voltage range value, the control unit 134 controls the dimming control module 12 to be in a normal working state to control the AC/DC control module 11 operates normally. When the value of the current output supply voltage Vcc collected by the sampling unit 131 is less than or equal to the highest voltage value, it indicates that the LED lamp power supply 100 is short-circuited or overloaded, and the control unit 134 controls the dimming control module 12 in a protection mode of operation. When the value of the current output supply voltage Vcc collected by the sampling unit 131 falls outside the normal stable operating voltage range value, but is greater than the highest voltage value, the expression form is that the current output supply voltage Vcc fluctuates around the normal stable operating voltage range, and it means that the AC/DC control module 11 is in an undervoltage state, that is, the output supply voltage Vcc cannot provide a normal voltage for the normal operation of the AC/DC control module 11, at this time, the control unit 134 controls the dimming control module 12 to be in a standby working mode. As described above, any one of the normal stable operating voltage range values should be greater than the highest voltage value, that is, as long as the detected instantaneous voltage value is less than or equal to the highest voltage value, the control unit 134 will control the dimming control module 12 to perform a protection mode of operation.

The auxiliary control module 13 also includes a delay unit 136. The delay unit 136 is configured to extend the time controlled by the control unit 134 that the dimming control module 12 is in the protection mode of operation when the value of the current output supply voltage Vcc collected by the sampling unit 131 is less than or equal to the highest voltage value, that is, when the LED lamp power supply 100 is short-circuited or overloaded.

The dimming signal input module 14 can be an electronic dimmer whose main function is to adjust different brightness of the light, that is, to reduce or increase the RMS voltage to cause different intensity light output by the average power light. The dimming signal input module 14 is electrically connected to the dimming control module 12. The dimmer may be one of a forward phase shifting dimmer or a back phase shifting dimmer. The forward phase shifting dimmer is also referred to a silicon controlled rectifier or a thyristor. In particular, a bidirectional controlled rectifier is used to control the opening and closing of the circuit to supply power to the load. The back phase shifting dimmer uses a field effect transistor or an insulated grid bipolar triode as an electronic switch to control the conduction or cut off the power supply to the load. In this embodiment, the dimming signal input module 14 is a bidirectional controlled rectifier, which is a prior art and will not be described again. When the thyristor cuts the input sine wave phase, a PWM signal that forms a certain duty cycle is output by the dimming control module 12. When the dimming signal input module 14, i.e., the tangent phase angle of thyristor is very small, the output supply voltage Vcc controlled by the AC/DC control module 11 will be very small under the action of the dimming control module 12, thus making the AC/DC control module 11 unable to start. The present invention can also solve the technical problem, and the specific working principle will be explained below.

The dimming execution module 15 is electrically connected to an output end of the power conversion module 11 and configured to control a voltage value input to the LED lamp according to an output of the dimming control module 12. Specifically, the dimming execution module 15 is a MOS transistor Q6. The MOS transistor can be an N-channel MOS transistor. A source and a drain of the MOS transistor are connected in series at an input end of the LED lamp, and a gate of the MOS transistor is electrically connected to an output end of the dimming control module 12. When the dimming control module 12 works normally, a PWM signal with a certain duty ratio is output, and the PWM signal can control the high frequency switching of the MOS transistor to be turned on and off, thereby achieving the purpose of adjusting the output voltage value, and thereby achieving the purpose of controlling the brightness of the LED lamp.

When the LED lamp power supply 100 is started, the power conversion module 10 provides a weak starting voltage to the AC/DC control module 11, so that the output supply voltage Vcc output by the AC/DC control module 11 is also very small, and the detection unit 131 of the auxiliary control module 13 detects the output supply voltage Vcc, and determines that the output supply voltage Vcc is outside the normal stable working range value, that is, fluctuates around the normal stable working range. The control unit 134 controls the dimming control module 12 to be in the standby mode of operation to prevent it from taking power from the output supply voltage Vcc, causing the AC/DC control module 11 to fail to start. When the AC/DC control module 11 is started, it controls the power conversion module 10 to generate a sufficiently large output supply voltage Vcc, that is, the output supply voltage Vcc is within a normal stable operating voltage range, and the detecting unit 131 also detects that the output supply voltage Vcc is within the normal stable operating voltage range value. At this time, the control unit 134 will control the dimming control module 12 to be in a normal working state, and the dimming control module 12 can also normally take power from the output supply voltage Vcc, so that the external circuit can be prevented from taking power from the high voltage end of the entire circuit.

Similarly, when the phase-cut angle of the dimming signal input module 14 is small, the dimming control module 12 controls the output supply voltage Vcc of the AC/DC control module 11 to be small, resulting in the AC/DC control module 11 is not working normally, the detection of the current output supply voltage Vcc by the detecting unit 131 of the auxiliary control module 13 determines that the output supply voltage Vcc is outside the normal stable operating range value, that is, fluctuating around the normal stable operating range, the control unit 134 controls the dimming control module 12 to be in the standby working mode, preventing it from controlling the AC/DC control module 11, so that the AC/DC control module 11 can be prevented from stopping and then the LED lamps can be prevented from flashing, so that the LED lamps can be prevented from flickering due to dimming during normal operation.

In addition, when the LED lamp power supply is short-circuited or overloaded, the output supply voltage Vcc of the output of the AC/DC control module 11 will fluctuate drastically and will be directly less than or equal to the highest voltage value, through the detection unit 131 and the judgment unit 135, the control unit 134 will control the dimming control module 12 into the protection operating mode and prevent it from output PWM signal, so as to protect the dimming execution module 15, i.e. MOS tube from being burnt.

Compared with the prior art, the LED lamp power supply of the present invention can solve the above various technical problems, thereby providing the quality of the LED lamp power supply 100, and thus providing the light-emitting effect of the LED lamp, thereby meeting the needs of the user.

Figure 3:
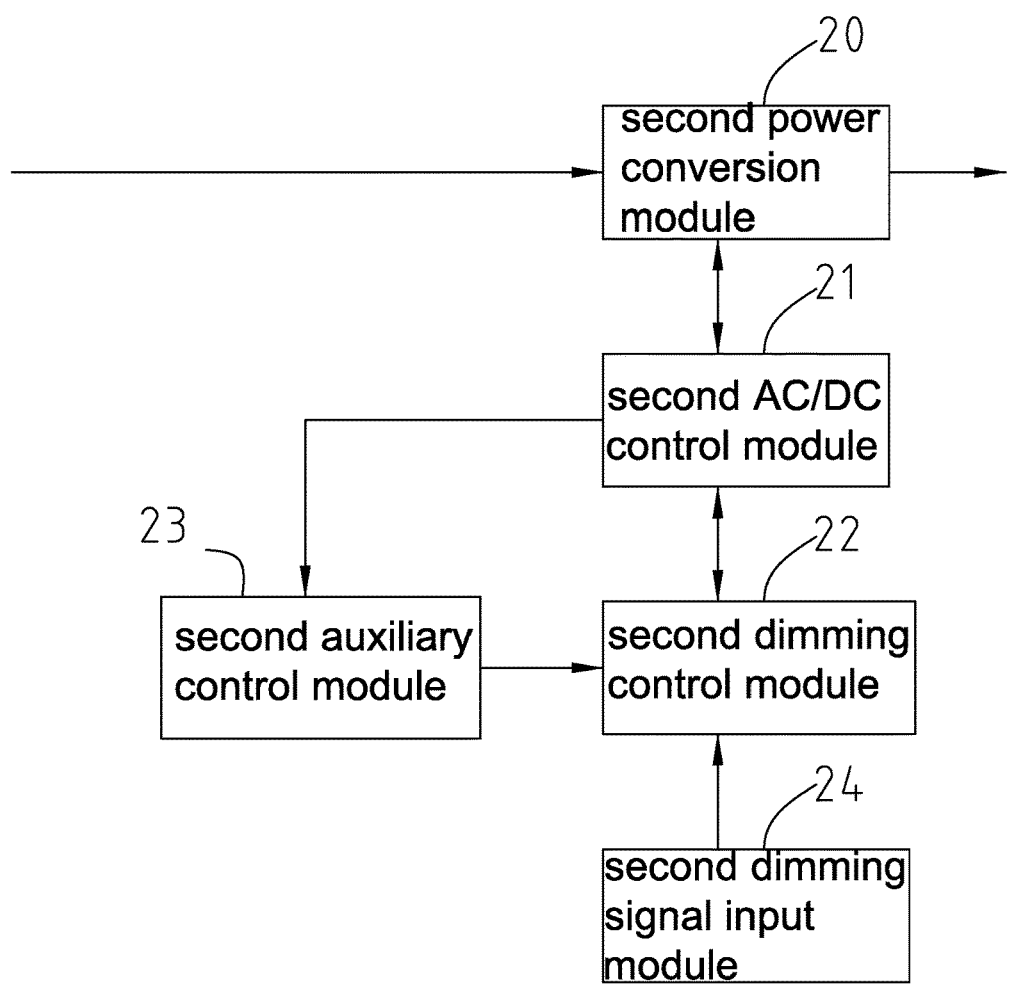
FIG. 3 is a schematic block diagram of a LED lamp power supply according to a second embodiment of the present invention.
Figure 4:
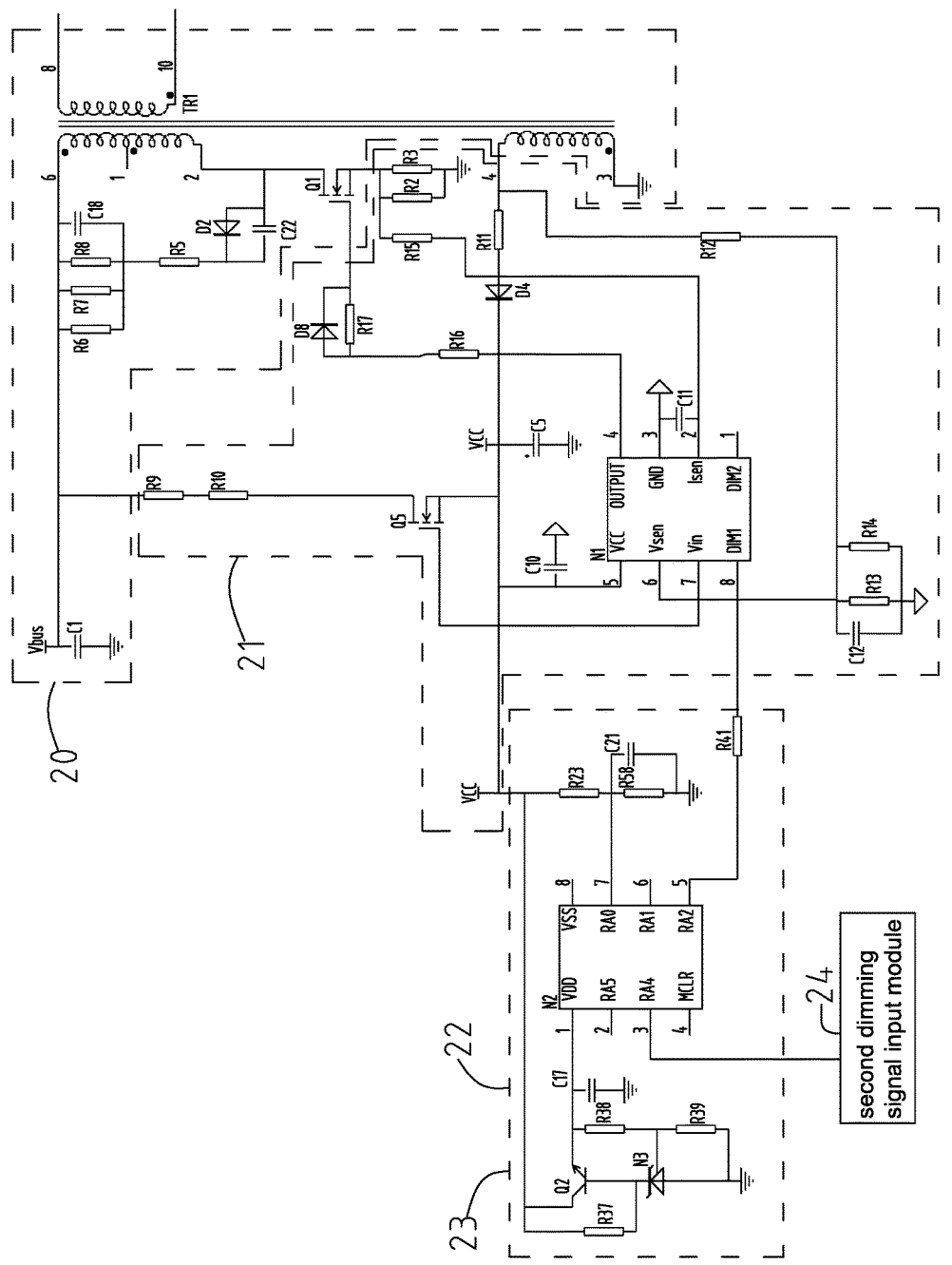
FIG. 4 is a circuit diagram of the LED lamp power supply of FIG. 3.

As shown in FIG. 3 and FIG. 4, it is a circuit block diagram and a circuit diagram of a second LED lamp power supply 200 according to a second embodiment of the present invention. The second LED lamp power supply 200 includes a second power conversion module 20, an second AC/DC control module 21 for controlling the output of the power conversion module 10, and a second dimming control module 22 electrically connected to the second AC/DC control module 21. a second auxiliary control module 23 for controlling the working state of the second dimming control module 22, and a second dimming signal input module 24 electrically connected to the second dimming control module 22.

The second embodiment differs from the first embodiment only in the mode of dimming control. In the first embodiment, the second dimming signal input module 24 is a thyristor. In the second embodiment, the second dimming signal input module 24 can be a 0 to 10 volt dimmer, or a communication device such as a WIFI or DALI dimmer, the 0 to 10 volt dimmer, or the WIFI or DALI dimmer is directly connected to the second dimming control module 22 to control the output of the second dimming control module 22. At the same time, the second dimming control module 22 directly controls the output of the second AC/DC control module 21 according to the 0 to 10 volt dimmer or WIFI or DALI dimmer to control the output of the second power conversion module 20. As for the structure and working principle of the 0 to 10 volt dimmer, or the WIFI or DALI dimmer, it should be a technique known to those skilled in the art, and details are not described herein.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. An LED lamp power supply, comprising
a power conversion module, an AC/DC control module for controlling the output of the power conversion module, and a dimming control module electrically connect with the AC/DC control module, and
an auxiliary control module for controlling an operating state of the dimming control module, the AC/DC control module controlling the power conversion module to generate an output supply voltage and controlling the size of the output supply voltage, the dimming control module is powered by the output supply voltage, and the auxiliary control module further includes a sampling unit, a startup range value preset unit, a protection value preset unit, and a control unit,
the sampling unit is configured to continuously collect the value of the output supply voltage, the startup range value preset unit is configured to preset a normal stable working voltage range value of the output power voltage, and the protection value preset unit is configured to preset the maximum voltage value of the output supply voltage that places the dimming control module in a standby mode when the LED lamp power supply is in short circuit or overload, the control unit sets the dimming control module in standby mode,
wherein the standby mode comprises:
a standby working mode when the value of the collected output supply voltage is greater than the highest voltage value of the normal stable operating voltage range value, or
a protection mode of operation when the value of the collected output supply voltage is less than or equal to the highest voltage value of the normal stable operating voltage range value,
the auxiliary control module further includes a delay unit, wherein the delay unit is configured to extend the time when the control unit controls the dimming control module to be in the protection mode of operation when the value of the current output supply voltage collected by the sampling unit is less than the highest voltage value.

2. The LED lamp power supply as claimed in claim 1, wherein the LED lamp power supply further includes a dimming signal input module for controlling an output of the dimming control module.

3. The LED lamp power supply as claimed in claim 2, wherein the dimming signal input module is a thyristor, and the thyristor is electrically connected to an input end of the power conversion module.

4. The LED lamp power supply as claimed in claim 3, wherein the LED lamp power supply further includes a dimming execution module electrically connected to an output end of the power conversion module, and the dimming control module is electrically connected to the dimming execution module to control an output of the dimming execution module.

5. The LED lamp power supply as claimed in claim 4, wherein the dimming execution module includes a MOS transistor.

6. The LED lamp power supply as claimed in claim 2, wherein the dimming signal input module is a 0 to 10 volt dimmer, and the 0 to 10 volt dimmer is directly electrically connected to the dimming control module to control an output of the dimming control module.

7. The LED lamp power supply as claimed in claim 6, wherein the dimming control module directly controls an output of the AC/DC control module in accordance with the 0 to 10 volt dimmer.

8. The LED lamp power supply as claimed in claim 1, wherein any one of the normal stable operating voltage range values is greater than the highest voltage value.

9. The LED lamp power supply as claimed in claim 2, wherein the dimming signal input module is a WIFI or DALI dimmer, and the WIFI or DALI dimmer is directly connected to the dimming control module to control the output of the dimming control module.

* * * * *